United States Patent
Prange et al.

(10) Patent No.: US 9,027,512 B2
(45) Date of Patent: May 12, 2015

(54) DOG CHEW TOY FOR CANINE DENTAL CARE AND METHOD FOR MAKING CHEW TOY

(75) Inventors: Stephen M. Prange, Ventura, CA (US); Mingyun Zhuang, Wenzhou (CN)

(73) Assignee: Stephen M. Prange, Ventura, CA (US)

( * ) Notice: Subject to any disclaimer, the term of this patent is extended or adjusted under 35 U.S.C. 154(b) by 342 days.

(21) Appl. No.: 13/494,863

(22) Filed: Jun. 12, 2012

(65) Prior Publication Data
US 2013/0327279 A1 Dec. 12, 2013

(51) Int. Cl.
*A01K 29/00* (2006.01)
*A01K 11/00* (2006.01)
*A23K 1/18* (2006.01)

(52) U.S. Cl.
CPC .............. *A01K 15/026* (2013.01); *A23K 1/1853* (2013.01)

(58) Field of Classification Search
CPC ..................................................... A01K 15/026
USPC ................... 119/710, 709; 426/282
See application file for complete search history.

(56) References Cited

U.S. PATENT DOCUMENTS

| | | | |
|---|---|---|---|
| 1,149,170 A * | 8/1915 | Allis ............................. | 119/710 |
| 5,711,254 A * | 1/1998 | O'Rourke ..................... | 119/710 |
| 6,277,420 B1 * | 8/2001 | Andersen et al. ............... | 426/92 |
| 6,425,348 B1 * | 7/2002 | Twain ............................ | 119/482 |
| 6,584,938 B2 * | 7/2003 | Sherrill et al. ................. | 119/710 |
| D478,705 S * | 8/2003 | Dahl et al. ....................... | D1/125 |
| 6,799,536 B1 * | 10/2004 | Jia et al. ......................... | 119/710 |
| D497,701 S * | 11/2004 | Tepper et al. ................... | D1/120 |
| 7,194,981 B2 * | 3/2007 | Kirch et al. .................... | 119/710 |
| D594,182 S * | 6/2009 | Hague ............................ | D1/199 |
| 7,691,426 B2 * | 4/2010 | Axelrod et al. ................ | 426/132 |
| 7,976,884 B2 * | 7/2011 | Weinberg ....................... | 426/282 |
| 8,215,267 B2 * | 7/2012 | Axelrod et al. ............... | 119/710 |
| 8,349,381 B2 * | 1/2013 | Weinberg ...................... | 426/282 |
| 8,479,687 B2 * | 7/2013 | Anderson et al. ............. | 119/709 |
| 8,613,261 B2 * | 12/2013 | Mendal et al. ................. | 119/710 |
| 8,677,943 B2 * | 3/2014 | Axelrod et al. ............... | 119/710 |

* cited by examiner

*Primary Examiner* — Yvonne Abbott-Lewis
(74) *Attorney, Agent, or Firm* — Holland & Knight LLP; Richard E. Lyon, Jr.

(57) ABSTRACT

A chew toy for canine dental care formed of a plurality of elongated rawhide strands, each strand defining a width within the range of about 0.20 to 7.5 millimeters and a thickness within the range of about 0.20 to 3.0 millimeters. The strands are braided together so as to define at least one rawhide braid of a desired size. The rawhide braid is wound or twisted and tied to define a desired chew toy size and shape that, upon be chewed by a dog, provides a messaging of the dog's gums and a cleaning and flossing of the dog's teeth. The chew toy can be soaked in an aqueous solution containing one or more therapeutic agents and/or an animal attractant and baked dry to impregnate the agent(s) or attractant within the rawhide for release when chewed by a dog.

34 Claims, 5 Drawing Sheets

DOG CHEW TOY FOR CANINE DENTAL CARE AND METHOD FOR MAKING CHEW TOY

BACKGROUND OF THE INVENTION

The present invention relates to a novel chew toy for dogs for improving canine dental care. In recent years veterinarians have become increasingly aware of the need for improved canine dental care and are frequently recommending the regular brushing of a dog's teeth to prevent decay and gum disease. Because such a practice is distasteful to many pet owners and their pets, the veterinarians' recommendations are generally ignored to the detriment of the animals' teeth and gums.

Recognizing the need for improved canine dental care and the reluctance of pet owners to brush their animals' teeth, the pet industry has developed a wide variety of chew toys that provide a cleaning of the dog's teeth and a messaging of its gums as well as pleasant enjoyment for the dog. A popular chew toy for such purposes comprises a short length of cotton rope having large knots formed near the ends thereof so as to resemble a classic dog bone configuration. As the dog chewed the toy, the soft cotton rope provided a cleaning and flossing of the dog's teeth superior to that provided by conventional hard rubber toys. Cotton, however, is not inherently attractive to dogs. To enhance the attractiveness of chew toys to dogs, a wide variety of rawhide chew toys have been developed, some of which have become very popular. Rawhide is the hide of an animal such as cattle, pigs, buffalo, deer or elk that has not been exposed to tanning. Rawhide has an inherent advantage over cotton in dog chew toys because of the attractiveness of its texture to dogs. Also, rawhide is more abrasive than cotton or the rubber from which chew toys are made, arguably providing improved plague removal and superior cleaning of the animal's teeth when chewed. However, the rawhide chew toys heretofore developed do not provide the beneficial flossing effect of the cotton chew toys. The chew toy of the present invention provides both the benefits of rawhide and the flossing effect of the less attractive cotton chew toys.

Recent years have seen the addition of effective therapeutic agents such as a dental cleansing agent or breath freshener to pet chew toys as well as an added attractant such as a flavoring or scent. While scents and flavorings have been added to rawhide chew toys, they are typically applied to and carried solely by the surface of the rawhide. Once the animal licks the flavoring from the toy, any future enticement to chew provided by the scent or flavoring is lost and the chew toy may be ignored. The same would be true of a therapeutic agent carried by the surface of the chew toy. The chew toy of the present invention not only utilizes the inherent attractiveness of the rawhide while providing the beneficial flossing found in many of the cotton toys, it can effectively carry and deliver one or more therapeutic agents and/or carry an added animal attractant.

SUMMARY OF THE INVENTION

The chew toy of the present invention comprises one or more relatively thin and narrow elongated rawhide strands cut from a processed rawhide split, braided, wound and/or twisted and tied together to form the desired chew toy size and shape. The resulting chew toy is attractive to dogs and, when chewed, can provide a thorough cleaning and flossing of the animal's teeth, exercising of its jaws and a reduction in canine halitosis.

In modified embodiments of the present invention, the formed chew toys can be soaked in an aqueous solution containing one or more therapeutic agents, such as a dental cleansing agent or breath freshener, and/or an additional attractant such as a flavoring or scent, so as to allow the agent(s) and/or attractant to be absorbed by the rawhide material. The toys are then baked dry so as to impregnate the therapeutic agent(s) and/or attractant within the strands of the formed toy. Alternatively, the rawhide material may be soaked in an aqueous solution containing one or more therapeutic agents and/or an animal attractant and baked dry prior to being cut into strands or the individual cut strands may be soaked in the desired aqueous solution(s), baked dry and then rewetted to a pliable state prior to being formed into the desired pet toy size and shape.

DETAILED DESCRIPTION OF THE PREFERRED EMBODIMENTS

Figure 1:
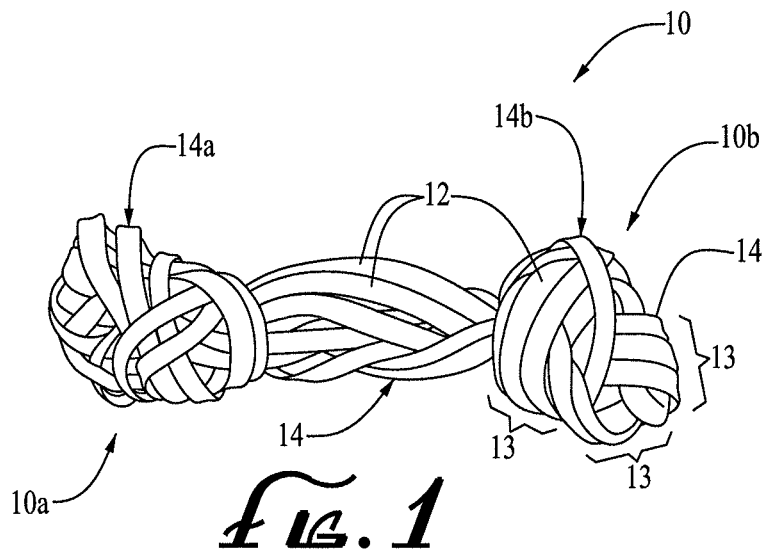
FIG. 1 is a perspective view of an exemplary embodiment of a chew toy of the present invention.
Figure 5:
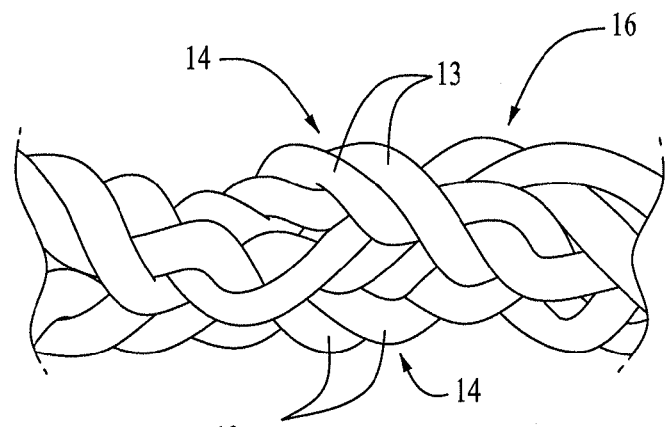
FIG. 5 is a perspective view of a composite braid of strands used in forming a chew toy of the present invention.
Figure 6:
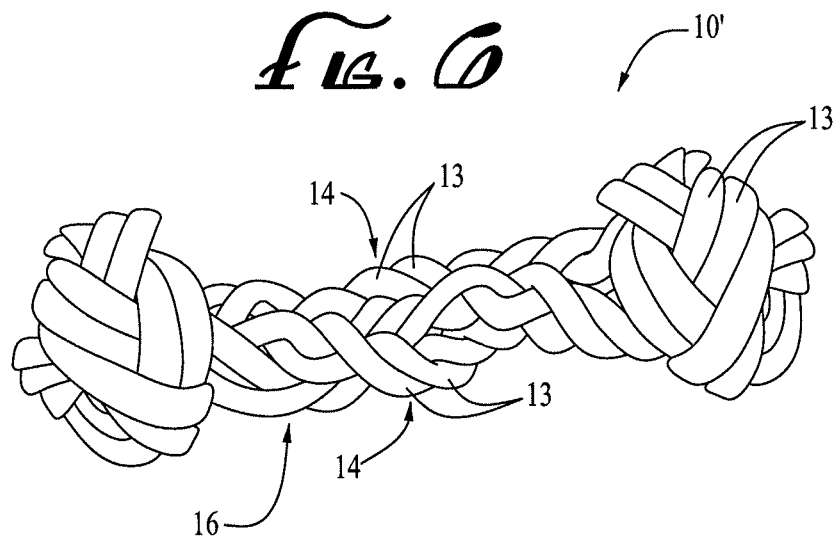
FIG. 6 is a perspective view of an alternate embodiment of a chew toy of the present invention sized for larger dogs.

Referring now in detail to the drawings, a first embodiment of the chew toy 10 of the present invention is illustrated in FIG. 1. As seen therein, the chew toy 10 is comprised of a plurality of relatively thin and narrow elongated strands 12 of processed rawhide, preferably bovine or porcine in origin. The rawhide strands 12 are cut from a split of rawhide, soaked in water or an aqueous solution so as to be pliable and then braided together preferably, in groups 13 so as to form a braid 14 of a desired length and size. The braid 14 is then wound or twisted and tied to form the desired shape of the chew toy. The single braid 14 of which the chew toy 10 illustrated in FIG. 1 is formed is twisted and tied at its extended ends to resemble a bone. To form a larger chew toy for larger dogs, the number of individual strands 12 in each group 13 of strands can be increased (see, e.g. FIG. 4) and/or the braid 14 can be braided with one or more other braids 14 to form a composite braid 16 (see, e.g. FIG. 5) which can be wound or twisted and tied to form the desired shape of the chew toy (see, e.g. FIG. 6). As will be discussed, the size of the individual strands 12, particularly the width of the strands, also can be increased albeit to a lesser degree so that the toy can continue to provide its beneficial flossing effect.

Figure 3:
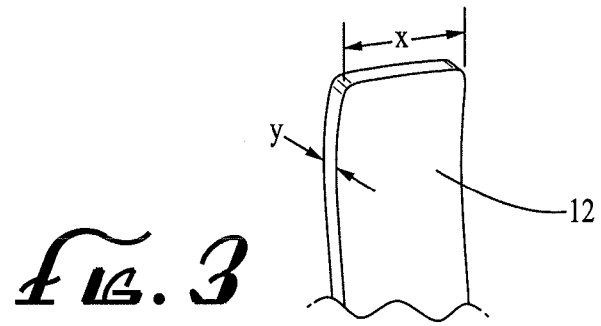
FIG. 3 is a partial perspective view of a rawhide strand used in the fabrication of a preferred embodiment of a chew toy of the present invention.

To form a preferred embodiment of the chew toy of the present invention, one or more cured splits 18 of a rawhide are selected that preferably contain no other animal ingredient and have never been in any BSE countries (countries afflicted with Bovine Spongiform Encephalopathy). The selected splits were typically formed by passing acceptable strips of rawhide through a conventional splitting station in which the fat on top of each hide was removed. The hides were then thoroughly cleaned and passed through a second splitting station where the top grains and possibly the layers intermediately adjacent the top grain were removed from the hides for leather applications. The remaining layer on each hide defines a split of processed rawhide. The splits are cleansed, typically in a solution of water and hydrogen peroxide, rinsed in clean water and then cured in a conventional drying station or under the sun. The cured rawhide split(s) 18 which are selected for the formation of the chew toy 10 of the present invention are relatively rigid after curing and are first directed through a shredding machine 20 to effectively cut or slice the split(s) into a plurality of elongated thin strands 12 of rawhide of which the chew toy 10 is formed. Each strand 12 is cut so as to be sufficiently thin such that when a dog chews on the toy 10, the rawhide strands can flex and fit between a dog's teeth to effect a flossing thereof. The individual strands 12 are preferably rectangular in cross-section and measure from about 0.20 to 7.5 millimeters in width and about 0.20 to 3.0 millimeters in thickness (see FIG. 3), although the thickness of each strand is typically less than 1 mm. The length of the cut strands are typically about 2.0 to 3.0 meters. The length of the strands, however, will vary depending on the size of the split from which they are cut, the direction of the cut, the desired size and shape of the final chew toy 10 and the number of chew toys to be made with the strand. Also, the strands could be square in cross-section or, if desired, circular in cross-section, although a cylindrical strand likely would require an additional forming step.

The relatively rigid rawhide strands 12 are then wetted by being soaked in water or another suitable liquid at a soaking station 22 for a time sufficient to soften the strips and make them pliable. This typically takes about 2-10 minutes depending on the type of hide and the size of the strands. At the soaking station, the strands 12 can either be immersed in a container of water or sprayed with water. The wetted pliable strands 12 are then braided together at a forming station 24 to form an elongated braid 14 of rawhide strands.

Each braid 14 of rawhide strands 12 is typically formed of three groups 13 of strands 12 with each group 13 being comprised of from one to eight strands, although the number of strands 12 in each group 13 could be increased and the number of groups in a braid could vary. Also, as noted earlier, two or more braids 14 of rawhide strands can be braided together to form a composite braid 16 of a desired size. In either case, the single braid 14 or the composite braid 16 is then cut into desired lengths and each length is then wound and/or twisted and tied into the desired chew toy shape.

Figure 4:
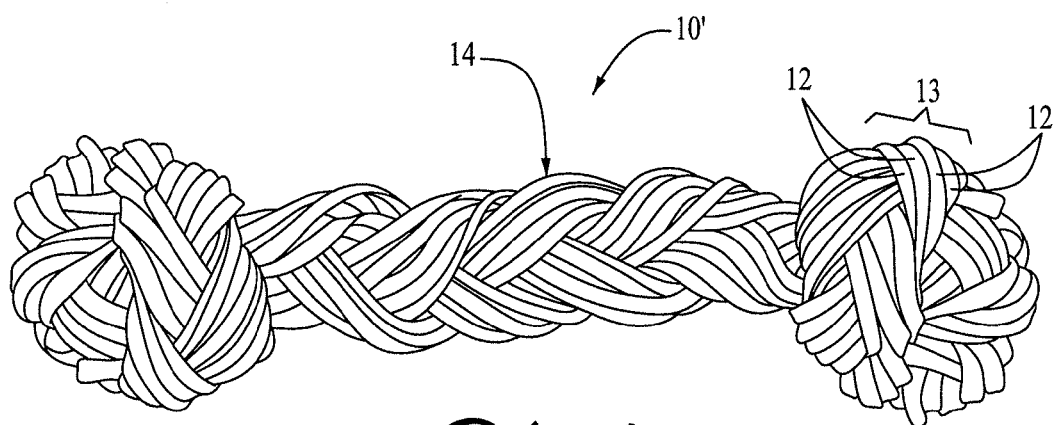
FIG. 4 is a perspective view of a chew toy of the present invention configured for larger dogs.

By way of examples, the embodiment of toy 10 illustrated in FIG. 1 is formed of a single braid 14 of three groups 13 of strands 12 with each group being comprised of three strands 12 and wherein the extended end portions 14*a* and 14*b* of the braid 14 are tied off in enlarged end knots 10*a* and 10*b*. The individual strands 12 are rectangular in cross section and measure 0.30 mm by 2.5 mm. FIG. 4 illustrates a similarly shaped chew toy 10' sized for larger dogs. Chew toy 10', like toy 10, is also formed of a single braid 14 of three groups of strands. However, each group 13 of strands in chew toy 10' is comprised of eight strands. Again, the extended end portions of the braid are tied off in enlarged end knots. The individual strands in chew toy 10' measure 0.35 mm by 2.5 mm.

As a result of the above-described chew toy configurations, the toy retains the rawhide texture that is attractive to dogs and when chewed, the thin strands 12 provides a flossing of the dog's teeth, regardless of the overall size of the chew toy. By so varying the number of strands in each braid and/or the number of braids, the size of the chew toy can be readily varied while the individual thin and relatively small rawhide strand sizes are preserved so as to retain the flossing benefits derived therefrom which are not found in the formation of conventional rawhide chew bonds.

Figure 7:
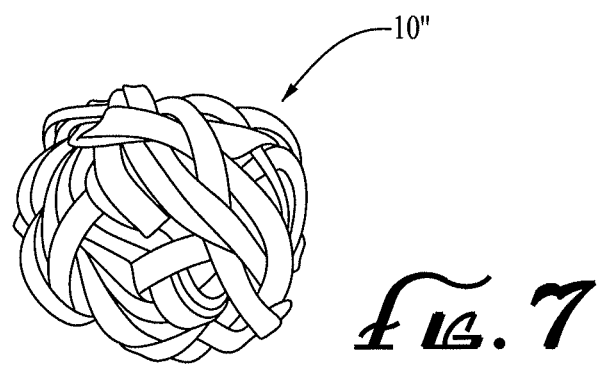
FIG. 7 is a perspective view of a chew toy of the present invention in which a braid is rolled and tied to form a chew toy of a different shape than the chew toys illustrated in FIGS. 1, 4 and 6.

While chew toys 10 and 10' are shaped to resemble a bone, the shape of the chew toy can be varied. An example of a round chew toy 10" constructed in accordance with the present invention is illustrated in FIG. 7. The generally spherical chew toy 10" illustrated in FIG. 7 is formed of a single braid of three groups of strands with each group being comprised of two strands. The braid is wound into a generally spherical configuration and tied at its extended end by inserting the outer end portions of the two groups of strands under previously wound portions of the strands and pulling the end portions tight so that the toy will retain its shape. By way of example, a round chew toy 10" such as that illustrated in FIG. 7 has been formed with strands measuring 0.35 mm by 5.0 mm in cross-section, although as with each of the chew toy configurations, differently sized strands, within the earlier defined dimensional parameters, could be employed, as could a different number of strands in each group and a different number of groups in each braid.

Figure 8:
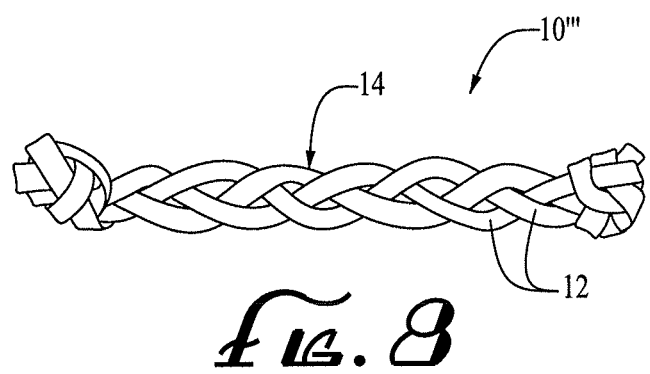
FIG. 8 is a perspective view of a modified embodiment of a chew toy of the present invention.

FIG. 8 illustrates a chew toy 10' formed of a single flat braid comprised of three strands tied together at the toy's 10 extended ends. Such a chew toy has been formed of strands measuring 0.70 mm by 5.0 mm. Other toy shapes could also be formed. In addition, while braiding is preferred because of its structural integrity, the individual strands in a chew toy of the present invention could be twisted together so as to form a composite strand as opposed to being braided. The composite strand would then be tied or wound and tied into a desired shape and continue to provide the above-described benefits of the present invention.

Figure 9:
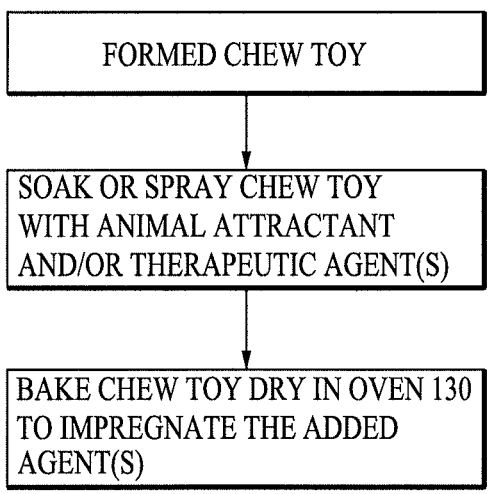
FIG. 9 is a schematic representation of a process for forming an alternate embodiment of the chew toy of the present invention.
Figure 2:
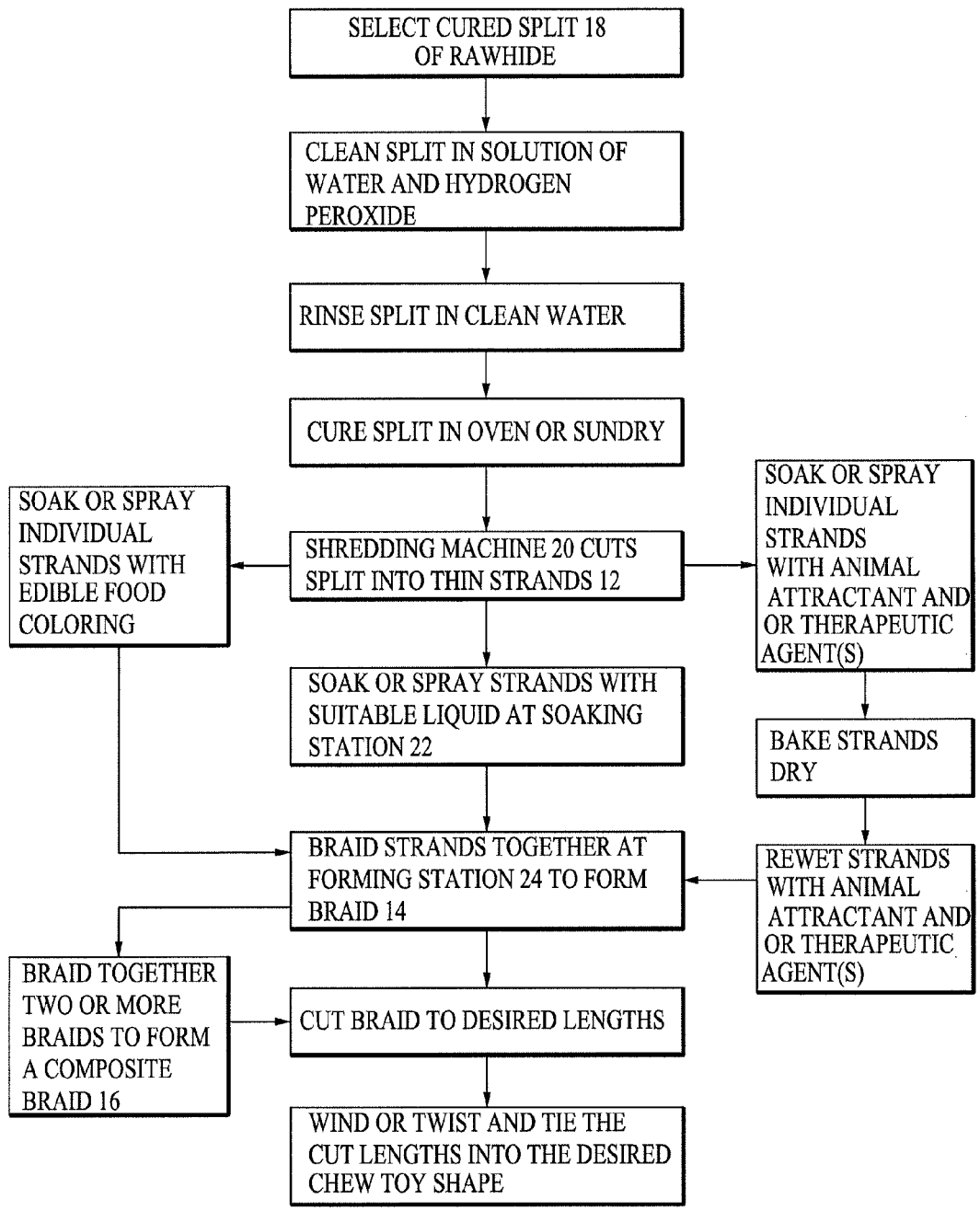
FIG. 2 is a schematic representation of a process for forming a chew toy of the present invention.
Figure 10:
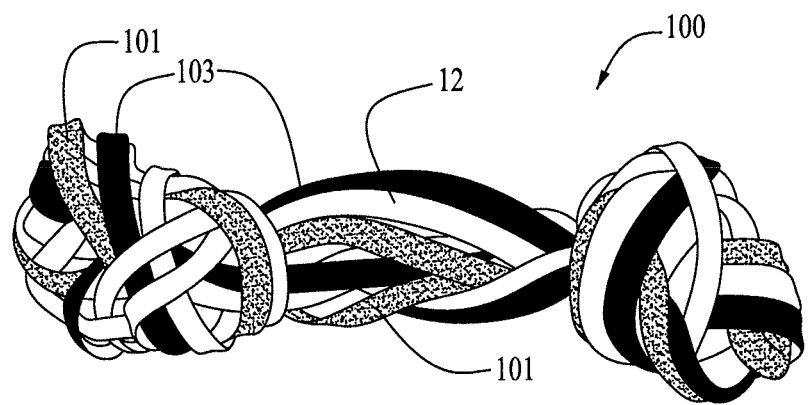
FIG. 10 is a perspective view of an alternative embodiment of the present invention.

In modified embodiments of the present invention, the chew toy 100 is impregnated with one or more therapeutic agents 101 such as a dental cleaning agent or breath freshener and/or an animal attractant 103 such as a flavoring or scent (see, e.g. FIG. 10). In a first impregnation process (see FIG. 9), the formed chew toys 10 are directed to a second soaking station 122 where they are soaked in an aqueous solution containing the desired therapeutic agent(s) and/or added attractant. At the soaking station, the chew toys 10 can be dipped into the solution or, alternatively, the solution can be sprayed onto the chew toys. The chew toys are preferably soaked in the solution from about ten minutes up to several hours depending on the animal attractant and/or therapeutic agent so that the therapeutic agent(s) and/or attractant in the solution can be absorbed into the rawhide strands comprising the toy. The soaked chew toys are then baked dry in a suitable oven 130 to thoroughly embed the therapeutic agent(s) and/or attractant within the rawhide material. The ideal temperature and drying time may vary depending on the type of hide, size of the strands and the particular agent(s) and/or attractant being impregnated therein.

Alternatively, individual strands 12 can be soaked in the same or different aqueous solutions containing the desired agent(s) and/or attractant at the soaking station 22, instead of just water prior to being braided, twisted and/or rolled into the desired chew toy shape. The soaked individual strands, are then dried in an oven to thoroughly impregnate the therapeutic agent(s) and/or attractant within the rawhide material and subsequently rewetted, preferably in an aqueous solution containing the same agent(s) and/or attractant in which the strands had been previously soaked to further enhance the impregnation of the therapeutic agent(s) and/or attractant in the strands and to render the strands pliable so that they can be formed into the desired shape as previously described.

In another embodiment of the process (not illustrated), the splits 18 could be soaked in one or more aqueous solutions containing the desired agent(s) and/or attractant and baked dry or otherwise cured prior to being directed to a shredding machine and cut into the rawhide strands.

The resulting chew toy 100 (see, e.g. FIG. 10) thus not only retains the attractive rawhide texture, it also retains the therapeutic agent(s) 101 and/or added attractant(s) 103 therein as it is licked and chewed by a dog, prolonging and maximizing the therapeutic life of the toy, and due to its thin strand construction, providing a flossing of the dog's teeth.

Figure 11:
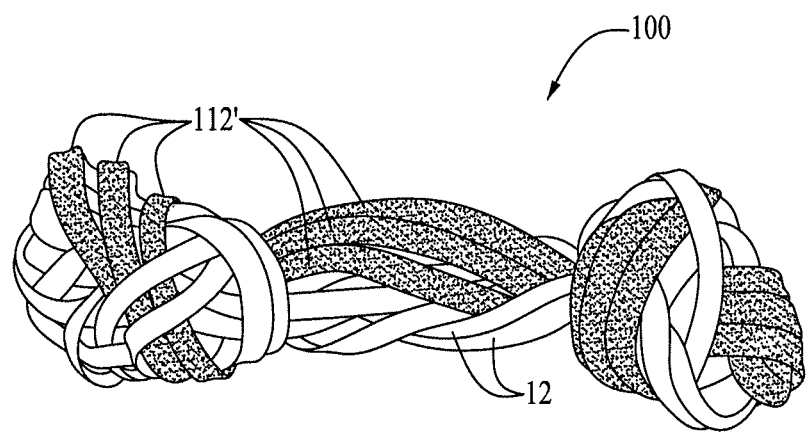
FIG. 11 is a perspective view of another alternative embodiment of the present invention.

By way of example, the preferred therapeutic agent 101 is sodium bicarbonate (baking soda) as it provides an excellent tooth cleansing agent. Calcium fluoride or sodium fluoride could be added to the aqueous solution to prevent decay. Chlorhexidine could be added to help prevent tartar buildup. Medicinal agents could also be added. Mint or chlorophyll, for example, also can be added to provide the chew toy with a breath freshener. Beef or anise, for example, could be added to provide the chew toy with an attractive flavoring and/or scent 103. These and other therapeutic and/or attractants can be used either alone or in combination. An edible food coloring can be added to the aqueous solution to identify a particular therapeutic agent or attractant by color coding. Alternatively, one or more individual rawhide strands 12 could be soaked in separate solutions containing different edible food colorings to impart different colors to different strands and the appropriately colored strand or strands could be integrated into the braiding step to provide each braid of strands with a particularly colored strand or strands to provide a visual identifier of the agent(s) and/or attractant(s) carried by the other strands in the formed chew toy. For example, a green strand 112' or group of green strands could indicate that the toy 100 contained a breath freshener (see, e.g. FIG. 11). A light blue strand, for example, could indicate the presence of sodium bicarbonate.

Various other changes and modifications could be made in carrying out the present invention without departing from the spirit and scope thereof. Insofar as these changes and modifications are within the purview of the appended claims, they are to be considered as part of the present invention.

What is claimed is:

1. A chew toy for canine dental care comprising a plurality of elongated strands of rawhide, each strand being sliced from a split of natural rawhide, generally square or rectangular in cross-section and defining a width within the range of about 0.20 to 7.5 millimeters and a thickness within the range of about 0.20 to 3.0 millimeters, said strands being braided together so as to define at least one rawhide braid of a desired size, said rawhide braid being wound or twisted and tied to define a desired chew toy size and shape that, upon being chewed by a dog, provides a messaging of the dog's gums and a cleaning and flossing of the dog's teeth.

2. The chew toy of claim 1 wherein each braid comprises three groups of said strands, each group comprising from one to eight of said strands.

3. The chew toy of claim 2 including an added canine attractant and/or at least one therapeutic agent impregnated within the rawhide strands.

4. The chew toy of claim 2 including an added canine attractant and/or at least one therapeutic agent impregnated within the rawhide strands.

5. The chew toy of claim 1 including an added canine attractant and/or at least one therapeutic agent impregnated within the rawhide strands.

6. The chew toy of claim 5 wherein said attractant is a flavoring or scent.

7. The chew toy of claim 5 wherein said therapeutic agent is selected from the group consisting of sodium bicarbonate, calcium fluoride, sodium fluoride, chlorhexidine, mint and chlorophyll.

8. The chew toy of claim 5 wherein said therapeutic agent is a breath freshener.

9. A chew toy for canine dental care comprising a plurality of elongated strands of rawhide, each strand being sliced from a split of natural rawhide, generally square or rectangular in cross-section and defining a width within the range of about 0.20 to 7.5 millimeters and a thickness within the range of about 0.20 to 3.0 millimeters, said strands being braided together so as to define a first plurality of rawhide braids of a desired size, a selected number of said first plurality of rawhide braids being braided together to define a composite braid of a desired size, said composite braid being wound or twisted and tied to define a desired chew toy size and shape that, upon being chewed by a dog, provides a messaging of the dog's gums and a cleaning and flossing of the dog's teeth.

10. The chew toy of claim 2 including an added canine attractant and/or at least one therapeutic agent impregnated within the rawhide strands.

11. The chew toy of claim 10 wherein said attractant is a flavoring or scent.

12. The chew toy of claim 10 wherein said at least one therapeutic agent is selected from the group consisting of sodium bicarbonate, calcium fluoride, sodium fluoride, chlorhexidine, mint and chlorophyll.

13. The chew toy of claim 10 wherein said at least one therapeutic agent is a breath freshener.

14. A chew toy for canine dental care comprising a plurality of elongated strands of rawhide, each strand being sliced from a split of natural rawhide, generally square or rectangular in cross-section and defining a width within the range of about 0.20 to 7.5 millimeters and a thickness within the range of about 0.20 to 3.0 millimeters, said strands being twisted together so as to define at least one composite strand of a desired size, said composite strand being wound and/or tied to define a desired chew toy size and shape that, upon being chewed by a dog, provides a messaging of the dog's gums and a cleaning and flossing of the dog's teeth.

15. A method for making a chew toy for canine dental care, said method comprising the following steps:
    cutting a plurality of elongated strands of rawhide from a cured split of rawhide such that each strand is generally square or rectangular in cross section and defines a width within the range of about 0.20 to 7.5 millimeters and a thickness within the range of about 0.20 to 3.0 millimeters;
    wetting the sliced strands so as to render the strands pliable;
    braiding the strands together so as to define at least one rawhide braid of a desired size; and
    winding or twisting and tying said braid to define the desired chew toy size and shape that, upon being chewed by a dog, provides a messaging of the dog's gums and a cleaning and flossing of the dog's teeth.

16. The process of claim 15 including the additional steps of soaking the formed chew toy in an aqueous solution comprising an added animal attractant and/or at least one therapeutic agent and baking the soaked strands dry to impregnate the added attractant or at least one therapeutic agent therein.

17. The process of claim 15 wherein said wetting step comprises submersing said strands in water.

18. The process of claim 15 wherein said wetting step comprises spraying said strands with water.

19. The process of claim 15 wherein said wetting step comprises soaking said sliced strands in an aqueous solution comprising an added animal attractant and/or at least one therapeutic agent and including the steps of baking the soaked strands dry to impregnate said added attractant and/or said at least one therapeutic agent therein and rewetting the dried strands to render the strands pliable.

20. A method for making a chew toy for canine dental care, said method comprising the following steps:
cutting a plurality of elongated strands of rawhide from a cured split of rawhide such that each strand is generally square or rectangular in cross section and defines a width within the range of about 0.20 to 7.5 millimeters and a thickness within the range of about 0.20 to 3.0 millimeters;
soaking the sliced strands in an aqueous solution containing an animal attractant and/or at least one therapeutic agent;
baking the strands dry to impregnate said added animal attractant and/or said at least one therapeutic agent therein;
rewetting the dried strands in an aqueous solution containing said animal attractant and/or said at least one therapeutic agent so as to enhance the amount of said attractant and/or agent(s) thereon and to render the strands pliable;
braiding the strands together so as to define at least one rawhide braid of a desired size; and
winding or twisting and tying said braid to define the desired chew toy size and shape that, upon being chewed by a dog, provides a messaging of the dog's gums and a cleaning and flossing of the dog's teeth.

21. The process of claim 20 wherein said soaking step comprises submersing said strands in said aqueous solution.

22. The process of claim 20 wherein said soaking step comprises spraying said strands with said aqueous solution.

23. A method for making a chew toy for canine dental care, said method comprising the following steps:
cutting a plurality of elongated strands of rawhide from a cured split of rawhide such that each strand is generally square or rectangular in cross section and defines a width within the range of about 0.20 to 7.5 millimeters and a thickness within the range of about 0.20 to 3.0 millimeters;
wetting the sliced strands so as to render the strands pliable;
braiding the strands together so as to define at least one rawhide braid of a desired size;
braiding together a selected number of said rawhide braids to define a composite braid of a desired size; and
winding or twisting and tying said composite braid to define the desired chew toy size and shape that, upon being chewed by a dog, provides a messaging of the dog's gums and a cleaning and flossing of the dog's teeth.

24. The process of claim 23 including the additional steps of soaking the formed chew toy in an aqueous solution comprising an added animal attractant and/or at least one therapeutic agent and baking the soaked strands dry to impregnate the added attractant or at least one therapeutic agent therein.

25. The process of claim 23 wherein said wetting step comprises submersing said strands in water.

26. The process of claim 23 wherein said wetting step comprises spraying said strands with water.

27. The process of claim 23 wherein said wetting step comprises soaking said sliced strands in an aqueous solution comprising an added animal attractant and/or at least one therapeutic agent and including the steps of baking the soaked strands dry to impregnate said added attractant and/or said at least one therapeutic agent therein and rewetting the dried strands to render the strands pliable.

28. A chew toy for canine dental care comprising a plurality of elongated strands of rawhide, each strand being sliced from a split of natural rawhide, generally square or rectangular in cross-section and defining a width within the range of about 0.20 to 5.0 millimeters and a thickness no greater than about 2.0 millimeters, said strands being braided together so as to define at least one rawhide braid of a desired size, said rawhide braid being wound or twisted and tied to define a desired chew toy size and shape that, upon being chewed by a dog, provides a messaging of the dog's gums and a cleaning and flossing of the dog's teeth.

29. The chew toy of claim 28 wherein the thickness of each said strand is no greater than about 1.0 millimeter.

30. The chew toy of claim 28 including an added canine attractant and/or at least one therapeutic agent impregnated within the rawhide strands.

31. A chew toy for canine dental care comprising a plurality of elongated strands of rawhide, each strand being sliced from a split of natural rawhide, generally square or rectangular in cross-section and defining a width within the range of about 0.20 to 5.0 millimeters and a thickness no greater than about 2.0 millimeters, said strands being braided together so as to define a first plurality of rawhide braids of a desired size, a selected number of said first plurality of rawhide braids being braided together to define a composite braid of a desired size, said composite braid being wound or twisted and tied to define a desired chew toy size and shape that, upon being chewed by a dog, provides a messaging of the dog's gums and a cleaning and flossing of the dog's teeth.

32. The chew toy of claim 31 wherein the thickness of each said strand is no greater than about 1.0 millimeter.

33. The chew toy of claim 31 including an added canine attractant and/or at least one therapeutic agent impregnated within the rawhide strands.

34. A chew toy for canine dental care comprising a plurality of elongated strands of rawhide, each strand being sliced from a split of natural rawhide, generally square or rectangular in cross-section and defining a width within the range of about 0.20 to 7.5 millimeters and a thickness no greater than about 2.0 millimeters, said strands being twisted together so as to define at least one composite strand of a desired size, said composite strand being wound and/or tied to define a desired chew toy size and shape that, upon being chewed by a dog, provides a messaging of the dog's gums and a cleaning and flossing of the dog's teeth.

* * * * *